(12) United States Patent
Canyon

(10) Patent No.: US 10,028,425 B2
(45) Date of Patent: Jul. 24, 2018

(54) SYSTEM, APPARATUS, AND METHOD FOR REMOTE SOIL MOISTURE MEASUREMENT AND CONTROL

(71) Applicant: James Canyon, San Diego, CA (US)

(72) Inventor: James Canyon, San Diego, CA (US)

(*) Notice: Subject to any disclaimer, the term of this patent is extended or adjusted under 35 U.S.C. 154(b) by 0 days.

(21) Appl. No.: 15/057,885

(22) Filed: Mar. 1, 2016

(65) Prior Publication Data

US 2016/0255763 A1   Sep. 8, 2016

Related U.S. Application Data

(60) Provisional application No. 62/127,243, filed on Mar. 2, 2015.

(51) Int. Cl.
*A01B 79/00* (2006.01)
*A01G 25/16* (2006.01)

(52) U.S. Cl.
CPC .......... *A01B 79/005* (2013.01); *A01G 25/167* (2013.01)

(58) Field of Classification Search
CPC .............................. A01B 79/005; A01G 25/167
See application file for complete search history.

(56) References Cited

U.S. PATENT DOCUMENTS

| | | | |
|---|---|---|---|
| 5,341,673 A | 8/1994 | Burns et al. | |
| 5,408,893 A | 4/1995 | McLeroy | |
| 5,663,649 A | 9/1997 | Topp et al. | |
| 5,933,015 A | 8/1999 | Siddiqui et al. | |
| 6,079,433 A * | 6/2000 | Saarem | A01G 25/167 137/1 |
| 6,281,688 B1 | 8/2001 | Yankielun | |
| 7,135,871 B1 | 11/2006 | Pelletier | |
| 7,222,519 B2 | 5/2007 | Ekanayake | |
| 7,474,105 B2 | 1/2009 | McDermid | |
| 7,705,616 B2 | 4/2010 | Hawkins | |
| 7,884,620 B2 | 2/2011 | Campbell | |
| 8,354,852 B1 | 1/2013 | Campbell et al. | |
| 8,849,523 B1 * | 9/2014 | Chan | G01S 13/89 111/149 |
| 8,915,131 B2 | 12/2014 | Aughton et al. | |
| 8,981,946 B2 | 3/2015 | Runge et al. | |

(Continued)

OTHER PUBLICATIONS

Lunt et al., Soil Moisture Content Estimation Using Ground-Penetrating Radar Reflection Data, Journal of Hydrology, vol. 307, Issue 1-4, Jun. 2005, pp. 254-269.*

*Primary Examiner* — Frederick M Brushaber

(57) ABSTRACT

A system for remote moisture monitoring and control includes: a measurement vehicle, including a vehicle body, a vehicle control unit, a transmitter antenna, and a receiver antenna; a moisture control server, including a processor, a non-transitory memory, an input/output, and antenna manager, a multi spectrum analyzer, a sensor manager, an irrigation manager, a soil simulator and a data bus; a vehicle storage facility; an irrigation controller; irrigation valves; a mobile control device; ground sensors. Also disclosed is a method including piloting measurement vehicle; obtaining moisture measurements, including controlling outbound transmission, determining reflected power, calculating dielectric constant via reflection calculation, determining soil moisture via lookup in soil calibration table; obtaining sensor measurements; calculating soil model; and adjusting irrigation.

22 Claims, 7 Drawing Sheets

(56) References Cited

U.S. PATENT DOCUMENTS

| | | | |
|---|---|---|---|
| 9,107,354 B2* | 8/2015 | Martin | A01G 25/167 |
| 9,743,574 B1* | 8/2017 | Maxton | A01B 79/005 |
| 2010/0306012 A1* | 12/2010 | Zyskowski | G06Q 10/06 |
| | | | 705/7.36 |
| 2011/0043230 A1 | 2/2011 | Morton | |
| 2012/0130552 A1* | 5/2012 | Schmidt | A01G 25/09 |
| | | | 700/284 |
| 2012/0239211 A1* | 9/2012 | Walker | A01G 25/16 |
| | | | 700/284 |
| 2014/0365084 A1* | 12/2014 | Chan | G01S 13/89 |
| | | | 701/50 |
| 2015/0359185 A1 | 12/2015 | Guy | |
| 2015/0366149 A1 | 12/2015 | Canyon et al. | |
| 2016/0018224 A1 | 1/2016 | Isler et al. | |
| 2016/0195631 A1* | 7/2016 | Morrison | G01V 3/12 |
| | | | 324/339 |

\* cited by examiner

System for Remote Moisture Monitoring and Control

Moisture Control Server

Mobile Control Device

Method for Remote Moisture Monitoring and Control

SYSTEM, APPARATUS, AND METHOD FOR REMOTE SOIL MOISTURE MEASUREMENT AND CONTROL

CROSS-REFERENCE TO RELATED APPLICATIONS

This application claims the benefit of U.S. Provisional Application No. 62/127,243, filed Mar. 2, 2015.

FIELD OF THE INVENTION

The present invention relates generally to the field of soil moisture measurement, and more particularly to methods and systems for remote measurement of soil moisture.

BACKGROUND OF THE INVENTION

Most of the world is suffering in a chronic state lacking fresh drinking water. This leads to a shortage of water for agriculture which makes it expensive or impossible to grow crops effectively.

Increased need for water conservation in recent years has led to higher food prices and higher costs for farmers and consumers alike. The need for conservation has stemmed from higher demands on food production and higher population bases in localized areas. Water authorities around the United States, and the world are enacting watering limits and water usage expectations to ensure the valuable resource is being used carefully.

In addition to agricultural needs, residential, sporting and landscaping all consume water at an alarming rate. It has been shown that in commercial crops, the amount of water used will greatly affect the profitability of the farm and therefore farmers are economically motivated to use the water carefully. Residential users of water are also motivated to conserve water for economic reasons.

Soil is a variable mixture of minerals, organic matter, gases, liquids, and various biological organisms. Commonly, soil is mainly comprised of a composition of various percentages of sand, silt, and clay. The ability for soil to retain water is highly dependent on the average particle size as the water "takes up the space" between the soil particles and the water tension is the mechanism which holds it in position. Many commercial farms or large agricultural areas do not have a uniform soil type consequently various areas require more/less water to maintain the same crop yield and quality.

Due to a lacking of accurate methods and devices for assessing water content of soil, farmers and other users of soil often end up using more water than necessary or optimal, or end up distributing water in a sub-optimal manner, such that some areas are watered less than optimal, and other areas are overwatered. This may cause direct environmental concerns, but also can create economic losses by water expenditure and crop yield loss.

As such, considering the foregoing, it may be appreciated that there continues to be a need for novel and improved devices and methods for soil moisture measurement.

SUMMARY OF THE INVENTION

The foregoing needs are met, to a great extent, by the present invention, wherein in aspects of this invention, enhancements are provided to the existing model of soil moisture measurement.

In an aspect, a system for remote moisture monitoring and control can include:

a) at least one measurement vehicle, further including:
   a vehicle body, which for example can be a ground vehicle body or an aviation vehicle body;
   a vehicle control unit, which can be attached to the vehicle body; and
   at least one transceiver antenna, which can be configured to send and receive electromagnetic signals, wherein the electromagnetic signals are reflected back from a ground surface layer of soil in a field;
b) a moisture control server, which can be connected to the measurement vehicle, via a network;
wherein the vehicle control unit can control transmission of an outbound electromagnetic signal with a predetermined incident wave power, via the transceiver antenna;
wherein the vehicle control unit is configured to determine a reflected power of an inbound electromagnetic signal, which is received via the transceiver antenna, wherein the inbound electromagnetic signal is a reflection in the soil of the outbound electromagnetic signal;
wherein the moisture control server is configured to determine a soil moisture of the field by lookup of a calculated dielectric constant in a soil calibration table that correlates dielectric constant with soil moisture;
wherein the moisture control server is configured to calculate the calculated dielectric constant via a reflection calculation, based on a predetermined dielectric constant of air, the incident wave power, and the reflected power.

In a related aspect, the moisture control server can be configured to periodically update the soil calibration table based on measurements against a calibration sample with known soil moisture values, whereby the moisture control server can be configured to perform a differential calculation of soil moisture In another aspect, a method for remote moisture monitoring and control can include:
a) Piloting measurement vehicle, wherein a measurement vehicle can be piloted over a field;
b) Obtaining moisture measurements, wherein the measurement vehicle obtains moisture measurements from the field, comprising:
   i. controlling transmission of an outbound electromagnetic signal with a predetermined incident wave power;
   ii. determining a reflected power of an inbound electromagnetic signal, wherein the inbound electromagnetic signal is a reflection of the outbound electromagnetic signal in soil of the field;
   iii. calculating a calculated dielectric constant via a reflection calculation, based on a predetermined dielectric constant of air, the incident wave power, and the reflected power; and
   iv. determining a soil moisture of the field by lookup of the calculated dielectric constant in a soil calibration table that correlates dielectric constant with soil moisture;
c) Obtaining sensor measurements, wherein the measurement vehicle obtains sensor measurements from the field, comprising:
   receiving sensor measurements from ground sensors in the field;
d) Calculating soil model, comprising
   implementing a numerical soil model, wherein a moisture control server calculates moisture propagation as a three-dimensional boundary value problem, by solving a predetermined set of ordinary differential equations with predetermined boundary values, wherein the predetermined set of ordinary differential equations are configured to model moisture and water propagation in the field;

e) Adjusting irrigation, comprising:

Controlling irrigation in the field by adjusting irrigation valves, based on predictions from the numerical soil model.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
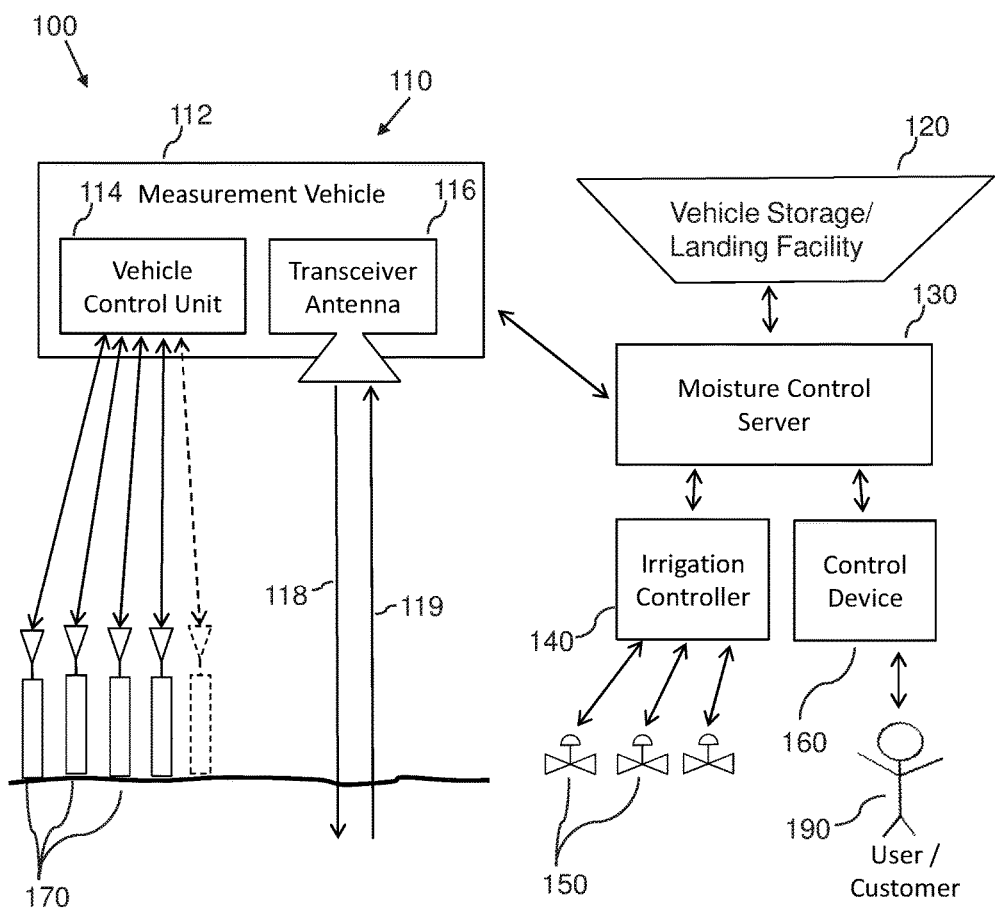
FIG. 1 is a schematic diagram illustrating a system for remote moisture monitoring and control, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

The system described utilizes active radar which sends a pulse of energy (at various frequencies as required) to the soil, the radar penetrates the soil at a depth inversely proportional to the transmitting frequency and a portion of the signal is reflected back to the transmitter based on the difference in dielectric constant between air and soil. When the signal returns to the receiver if the apparatus uses one antenna the transmitter is turned off, if using multiple antennas there is no need to turn off the transmitter. Knowing the transmit power and receive power, the device then calculates the reflection coefficient of the soil at that frequency and thereby determines the mean dielectric constant of the soil over a volume defined by radiation area and a depth which is a function of transmit frequency. In related embodiments, the transmission frequency can be modulated in such a way as to optimize the measurement of receive power as a function of time, which can allow the system to image dielectric constant as a function of depth.

In related embodiment, the transmission frequency can be modulated utilizing direct sequence spread spectrum techniques, which allows simultaneous transmission and receiving of active radar due to the spreading gain, thereby also providing greater accuracy.

By utilizing different frequencies, for example, 400 MHz, 200 MHz, 100 MHz, and 27 MHz, soil moisture can be determined as a function of depth by measuring the reflection coefficient at different frequencies, for example:

a) at a 400 MHz transmission frequency soil moisture can be measured at a depth of ~4 inches in sandy loam soil with er=10 and sigma=0.17;

b) at a 200 MHz transmission frequency soil moisture can be measured at a depth of ~8 inches in sandy loam soil with er=10 and sigma=0.17;

such that soil moisture can be determined at 0-4 inches and at 4-8 inches of depth.

An advantage of using this technique is that measurements are made utilizing a radar that is passed above the soil without requiring direct contact with soil. Installation of soil moisture sensors and systems is expensive and only provide soil moisture at one location, whereby these sensors are typically removed prior to harvesting making their use time consuming. Another advantage to this technique is its ability to deliver very accurate measurements of soil moisture taken at regular or irregular intervals of spatial dimensions.

A typical embodiment would be to mount the device into a flying device or ground robot which is either automated or driven/flown by hand, thus allowing three-dimensional mapping of soil moisture whenever required by the agronomist or manager of the farm or open green area.

Henceforth herein, Soil-water flux, J, is defined as the quantity of water leaving the profile per unit time across a specific depth and is equal to the −1*hydraulic conductivity "$K(\theta)$" multiplied by the head or "dH", or $J=-K(\theta)*dH$. Combining Soil-water flux with the equation of continuity yields a differential equation solution to hydraulic conductivity or $d\theta/dt=d/dz(K(\theta)*(dH/dz))$ which is a measurement of soil water flow in the z direction.

In the following, we describe the structure of an embodiment of a system for a system for remote moisture monitoring and control 100 with reference to FIG. 1, in such manner that like reference numerals refer to like components throughout; a convention that we shall employ for the remainder of this specification.

In an embodiment a system for remote moisture monitoring and control 100 can include:
- a) At least one measurement vehicle 110, further including:
  - i. a vehicle body 112, wherein the vehicle body is selected from the group consisting of a ground vehicle body and an aviation vehicle body;
  - ii. a vehicle control unit 114, which is attached to the vehicle body; and
  - iii. at least one transceiver antenna 116, which is configured to send and receive electromagnetic signals, wherein the electromagnetic signals can be bounced off a ground surface layer of a field;
- b) A vehicle storage facility 120, which can be configured to receive the at least one measurement vehicle 110;
- c) A moisture control server 130, which can be connected to the measurement vehicle 110, via a network;
- d) An irrigation controller 140, which is connected to the moisture control server 130;
- e) Irrigation valves 150, which are connected to the irrigation controller 140, such that the irrigation controller 140 is configured to control the irrigation valves 150, which are configured to adjust irrigation of the field;
- f) A mobile control device 160, which is connected to the control server, such that the mobile control device 160 can be configured to enable a user 190 to control functions of the control server, via interaction with the mobile control device 160;
- g) at least one ground sensor 170, which can be connected to the vehicle control unit 114, such that the vehicle control unit 114 can receive sensor measurements from the at least one ground sensor 170.

Figure 2:
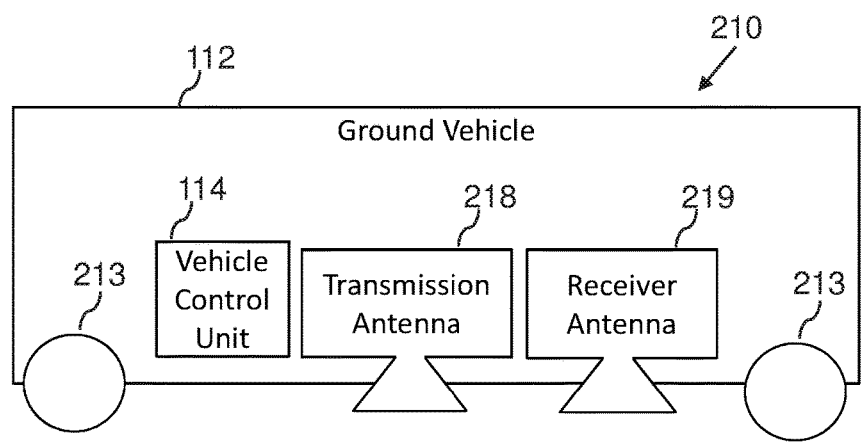
FIG. 2 is a schematic diagram illustrating a side view of a measurement vehicle, according to an embodiment of the invention.

In a related embodiment, as shown in FIG. 2, a measurement vehicle 110 can be configured as a ground vehicle 210, which includes wheels 213 or tracks, to remotely measure soil moisture in an agricultural field or other recreational or commercial landscape area, such as a golf course. The ground vehicle can be a small remote controlled vehicle with a length of 10"-30", or larger.

In related embodiments, for ground vehicles 210, the transceiver antenna 116 can comprise separate transmission 218 and receiver antennas 219.

In related embodiments, for ground vehicles 210, the transceiver antenna 116 can comprise at least one or several of:
- a) a soil moisture radar transmitting in a range of 0.2 to 1 Ghz;
- b) a light spectrometer transmitting in a range of 400 to 950 nm; and
- c) a FLIR thermal imager transmitting in a range of 900 to 14000 nm.

Figure 3:
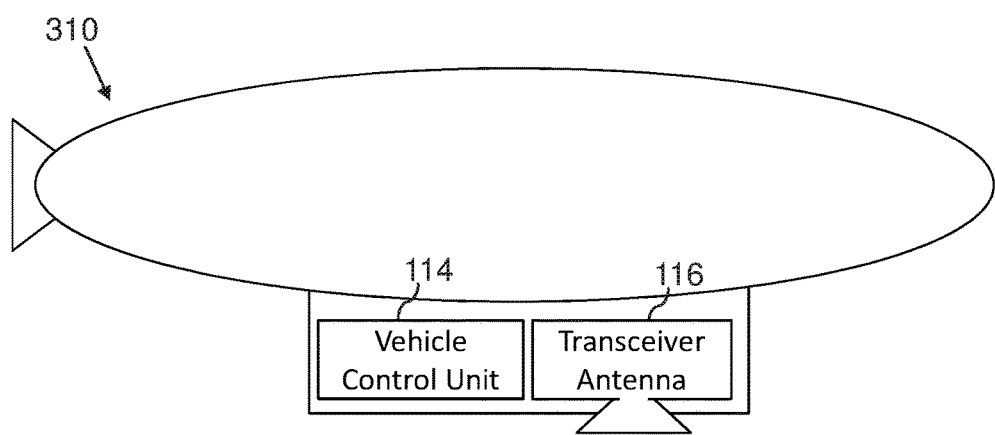
FIG. 3 is a schematic diagram illustrating a side view of a measurement vehicle, according to an embodiment of the invention.

In a related embodiment, as shown in FIG. 3, a measurement vehicle 110 can be configured as an aviation vehicle 310, here shown in a configuration as an airship measurement vehicle 310.

In further related embodiments, as shown in FIG. 3, transmission and receiving antenna functions of aviation vehicles 310 can typically be configured in one or more transceiver antennas 116, in order to reduce weight and improve space efficiency.

Figure 4A:
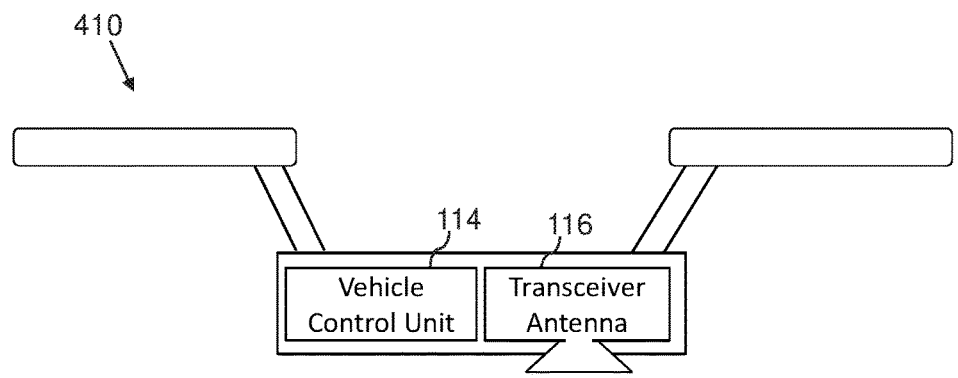
FIG. 4A is a schematic diagram illustrating a side view of a measurement vehicle, according to an embodiment of the invention.
Figure 4B:
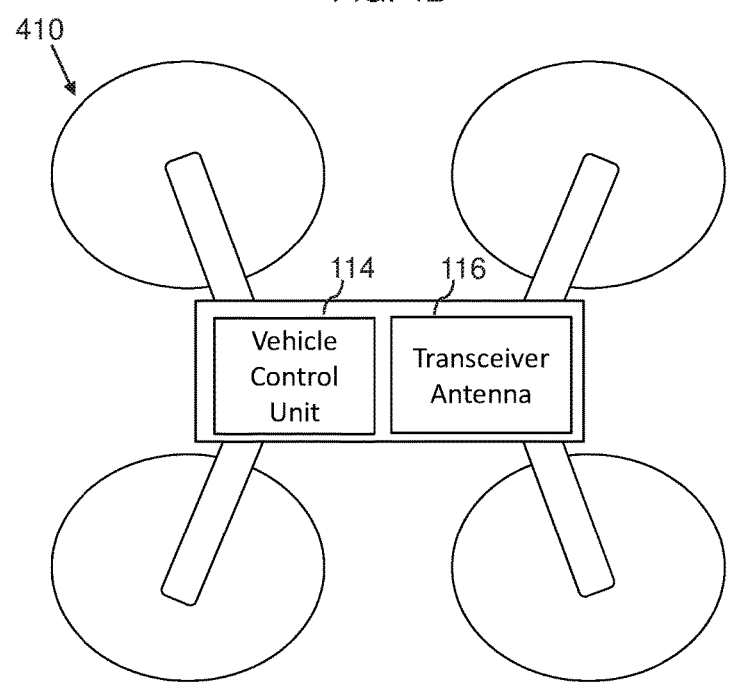
FIG. 4B is a schematic diagram illustrating a bottom view of the measurement vehicle shown in FIG. 4A, according to an embodiment of the invention.

In another related embodiment, as shown in FIGS. 4A and 4B, a measurement vehicle 110 can be configured as an aviation vehicle 410, here shown in a configuration as a quadcopter measurement vehicle 410, also referred to as remote controlled drone 410.

Figure 5:
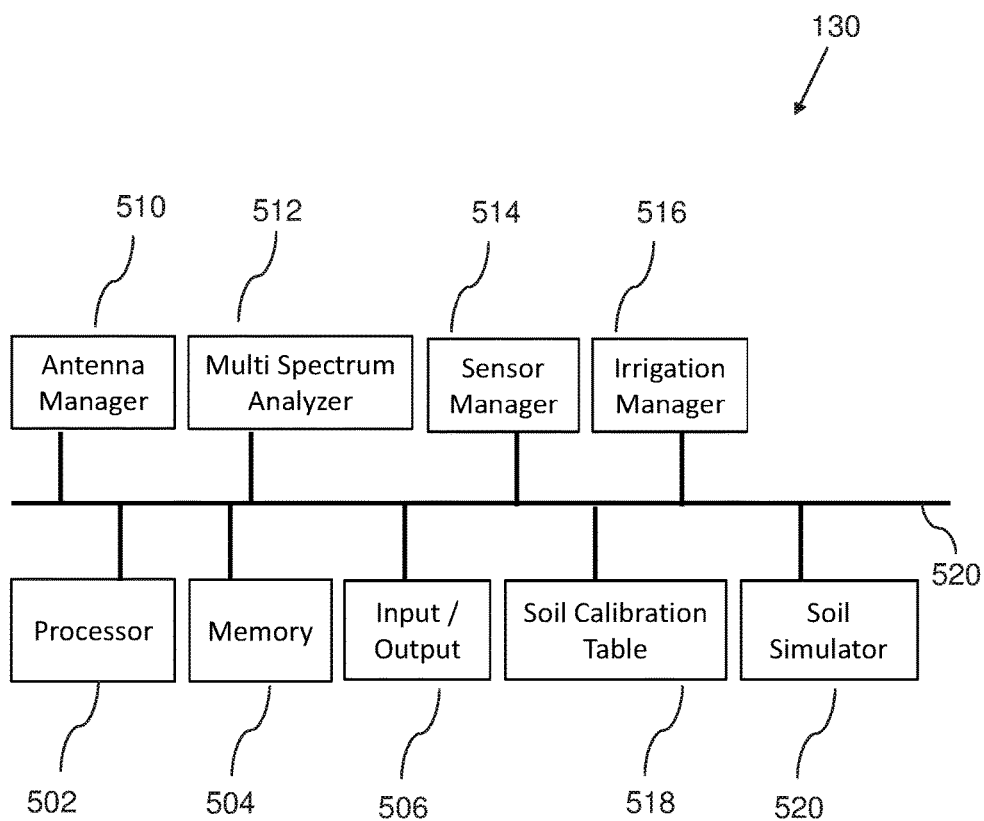
FIG. 5 is a schematic diagram illustrating moisture control server, according to an embodiment of the invention.
Figure 6:
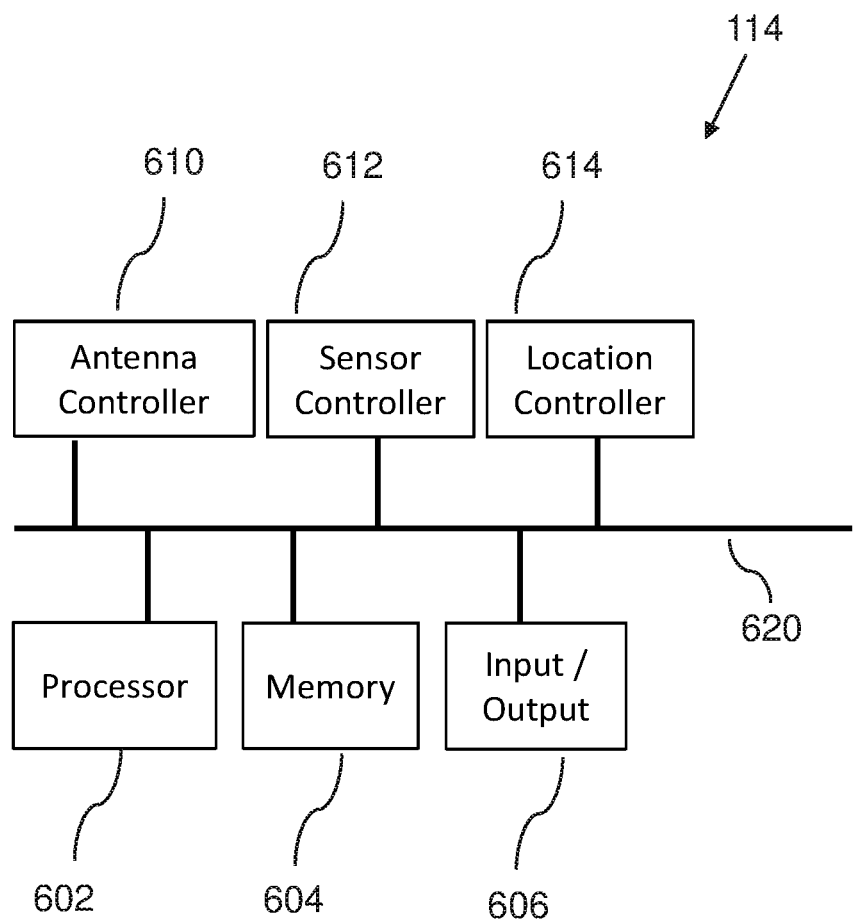
FIG. 6 is a schematic diagram illustrating a vehicle control unit, according to an embodiment of the invention.
Figure 7:
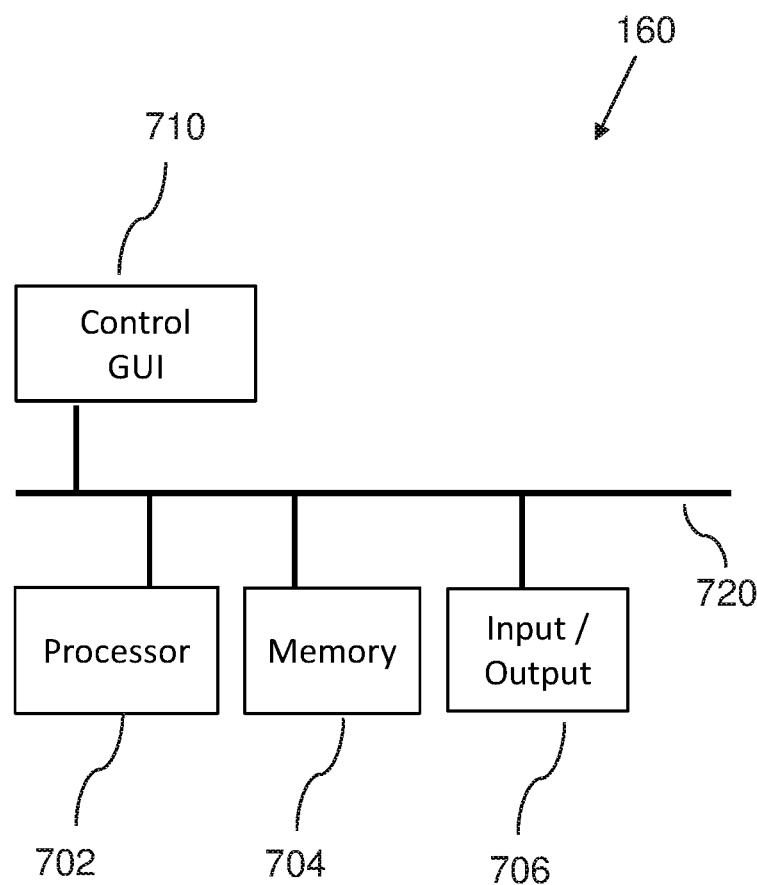
FIG. 7 is a schematic diagram illustrating a mobile control device, according to an embodiment of the invention.

In a related embodiment, as shown in FIG. 5, a moisture control server 130 can include:
- a) A processor 502;
- b) A non-transitory memory 504;
- c) An input/output component 506;
- d) An antenna manager 510, which can be configured to control functions of a transceiver antenna 116 on a measurement vehicle in communication with a vehicle control unit 114;
  - wherein the antenna manager 510 can be configured to generate and transmit an outbound radio frequency spectrum in communication with the transceiver antenna 116, via the vehicle control unit 114;
  - wherein the antenna manager 510 is configured to receive, store, and process a return radio frequency spectrum in communication with the transceiver antenna 116, via the vehicle control unit 114;
- e) A multi spectrum analyzer 512, which can be configured to analyze the return radio frequency spectrum;
- f) A sensor manager 514, which can be configured to receive, store, and process sensor measurements received in communication with the ground sensors 170, via the vehicle control unit 114; and
- g) An irrigation manager 516, which is configured to control irrigation valves 150 in communication via the irrigation controller 140; all connected via
- h) A data bus 520.

In a related embodiment, a vehicle control unit 114 can include:
- a) A processor 602;
- b) A non-transitory memory 604;
- c) An input/output 606;
- d) An antenna controller 610, which can be configured to communicate with and control functions of the transceiver antenna 116, including communicating the outbound radio frequency spectrum to the transceiver antenna 116 for transmission by the transceiver antenna 116 and receiving the return radio frequency spectrum in communication with the transceiver antenna 116;
- e) A sensor controller 612, which can be configured to receive the sensor data in communication with the ground sensors 170; and
- f) A location controller 614, which can be configured to determine a location of the measurement vehicle 110, for example via GPS, and/or WIFI or radio triangulation, or other well-known location methods; all connected via
- g) A data bus 620.

In a related embodiment, a mobile control device 160 can include:
- a) A processor 702;
- b) A non-transitory memory 704;
- c) An input/output 706; and
- d) A control graphical user interface 710, which can be configured to enable a user 190 to control functions of the moisture control server 130 and view data obtained in communication with the moisture control server 130; all connected via
- e) A data bus 720.

In related embodiments, the mobile control device 160 can include configurations as:

a) A web application, executing in a Web browser;
b) A tablet app, executing on a tablet device, such as for example an Android or iOS tablet device;
c) A mobile app, executing on a mobile device, such as for example an Android phone or iPhone, or any wearable mobile device;
d) A desktop application, executing on a personal computer, or similar device;
e) An embedded application, executing on a processing device, such as for example a smart TV, a game console or other system.

In a related embodiment, the vehicle control unit 114 can be configured to generate an outbound radio frequency spectrum and measure a return radio frequency spectrum, in communication with the transceiver antenna 116.

In a related embodiment, as shown in FIG. 2, a transmission antenna 218 and a receiver antenna 219 can be employed to transmit electromagnetic energy into the ground and receive the reflected energy for processing by the vehicle control unit 114, such that the data vehicle control unit 114 can generate a transmitted frequency/power spectrum and process a received frequency/power spectrum, to calculate soil moisture.

In a related embodiment, as shown in FIG. 1, a wireless transceiver antenna 116 can be employed to transmit electromagnetic energy into the ground and receive the reflected energy from the ground using the same antenna 116, such that the vehicle control unit 114 can generate and receive radio signals for processing. Further, the wireless electronics can connect the antenna using a switch from the transmitter to the receiver then calculate the effective reflection coefficient of the ground.

In a related embodiment, the measurement vehicle can further comprise a second antenna, such that the second antenna can be tuned to a second frequency to improve soil moisture measurement as a function of depth. The vehicle control unit 114 can combine signals or elect to use a signal from either the first transceiver antenna 116 or the second transceiver antenna. The controller vehicle control unit 114 can store the data for future download to the control server 130.

In another related embodiment, the ground sensors 170 can be stationary sensors which can be placed in fixed locations in the field. The ground sensors 170 can include: soil moisture sensors, soil salinity and PH sensors, weather sensors, plant nitrogen sensors, water flow rate sensors, water pressure sensors, water valves, and other types of sensors. The ground sensors 170 can be wireless such that, when the mobile device comes within range of a wireless network that is connected to the moisture control server 130 and/or to the mobile control device 160, such that sensor data is transferred from the sensor 170 to the moisture control server 130 and/or to the mobile control device 160, either directly via the wireless network, or indirectly via the moisture control server 130. Thereby the system for remote moisture monitoring and control 100 can function across very large farming areas/fields, while not burdening the ground sensor 170 with transceivers capable of communicating over multiple miles or batteries capable of supporting the large transmission power that would be needed for communication over long distances.

In a related embodiment, the measurement vehicle 110 can be designed to move throughout a field area and both gather sensor data from ground sensors 170 when the measurement vehicle 110 is within wireless range and measure soil moisture utilizing the transceiver antenna 116.

In a related embodiment, the measurement vehicle 110 can be configured to move throughout the field area, either by aviation above the field area or by driving on the field area, and either by a pre-programmed automatic piloting method or by a manual method.

In a related embodiment, the measurement vehicle 110 can, during data gathering, store all measurements locally on the vehicle control unit 114 and/or communicate the measurements to the moisture control server 130, as it measures/retrieves the sensor data. Once the measurement vehicle 110 has completed its course, it returns to the vehicle storage facility 120 and parks whereby a connection, which can be wired or wireless, or a combination thereof, is used to download the sensor data to the moisture control server 130.

In a related embodiment, the system for remote moisture monitoring and control 100 can be configured such that the vehicle control unit 114 of the measurement vehicle 110 processes a received radio power/frequency spectrum, based on a model for electromagnetic wave propagation in air, electromagnetic wave reflection in a presence of a dielectric discontinuity, the dielectric constant of air, the dielectric constant of soil as a function of water content, penetration depth of an electromagnetic wave into a dielectric discontinuity.

It is well-known by those skilled in the art that advanced soil moisture measurement devices utilize time domain reflectometry to measure the dielectric constant of soil. The dielectric constant of soil varies as a function of water contents of the soil. Dry soil, such as sand or loam, has a dielectric constant of approximately 4. Water has a dielectric constant of approximately 18 times that of dry soil and therefore as water molecules mix with dry soil the dielectric constant changes from 4 to much greater than 50 depending on the soil type.

When an electromagnetic wave that is traveling in air reaches a dielectric material, a portion of the power will continue through the transition and a portion of the wave will be reflected. The reflection is a function of the dielectric constant of air and the dielectric constant of the medium the wave comes in contact with. Specifically, $E_r$, the reflected wave is equal to the $E_i$ the incident wave multiplied by the reflection coefficient at the interface, or $n_1$—dielectric constant of air and $n_2$ the dielectric constant of the dielectric material, such as dry soil plus water, such that:

$$E_r = \left(\frac{n_1 - n_2}{n_1 + n_2}\right) E_i$$

Therefore, if we know the dielectric constant of air, $n_1$, the incident wave power $E_i$, and can measure the reflected power $E_r$, then we can calculate the average dielectric constant of the soil $n_2$, via a reflection calculation, such that:

$$n_2 = \frac{n_1(E_i - E_r)}{E_i + E_r}$$

Calibration charts of dielectric constant as a function of soil moisture and soil type are well-known for use in measuring soil moisture using time domain reflectometry. Given $E_r$, $E_i$, and $n_1$, we can calculate $n_2$, the dielectric constant of the soil, and apply a calibrated lookup table relating dielectric constant and soil moisture to derive the soil moisture.

In a related embodiment, the multi spectrum analyzer 512 of the moisture control server 130 can be configured to calculate the dielectric constant of the soil, and apply a calibrated lookup table relating dielectric constant and soil moisture to derive the soil moisture, wherein the dielectric constant can be calculated via a reflection calculation.

When an electromagnetic wave hits the boundary of a dielectric discontinuity the wave penetrates the dielectric proportionally to the wavelength of the transmitted signal and the dielectric constant mismatch. This penetration depth, $\delta$, also referred to as the skin depth, can be determined by the penetration formula:

$$\delta = \left(\frac{\sqrt{2}}{w\sqrt{\mu\varepsilon}}\right)\left[\sqrt{1 + \left(\frac{\sigma}{\omega\varepsilon}\right)^2} - 1\right]^{-\frac{1}{2}}$$

wherein:
$\sigma$ is the conductivity,
$\varepsilon$ is the dielectric constant, or permittivity,
$\mu$ is the permeability of soil, and
$\omega = 2\pi f$, where f is the transmission frequency In short, the depth of penetration can be measured and each time the frequency is reduced the depth is increased. Therefore, measuring at multiple frequencies is similar to measuring the soil moisture at different depths as defined by the penetration formula show above, whereby soil moisture can be determined as a function of depth.

Therefore, knowing the transmit power, antenna gain, antenna beam pattern, frequency, free space losses and scattering losses and measuring the receive power, the apparatus can easily measure reflected power and therefore can infer soil moisture.

In a related embodiment, the system for remote moisture monitoring and control 100 can be configured such that:
the vehicle control unit 114 is configured to control transmission of an outbound electromagnetic signal 118 with a predetermined incident wave power, via the transceiver antenna 116;
wherein the vehicle control unit 114 is configured to determine a reflected power of an inbound electromagnetic signal 119, which is received via the transceiver antenna, wherein the inbound electromagnetic signal is a reflection in the soil of the outbound electromagnetic signal;
wherein the moisture control server 130 is configured to determine a soil moisture of the field by lookup of a calculated dielectric constant in a soil calibration table 518 that correlates dielectric constant with soil moisture;
wherein the moisture control server 130 is configured to calculate the calculated dielectric constant via a reflection calculation, based on a predetermined dielectric constant of air, the incident wave power, and the reflected power.

In a related embodiment, the multi spectrum analyzer 512 can be configured to determine a soil moisture of the field by lookup of a calculated dielectric constant in a soil calibration table 518 that correlates dielectric constant with soil moisture;
wherein the multi spectrum analyzer 512 can be configured to calculate the calculated dielectric constant via a reflection calculation, based on a predetermined dielectric constant of air, the incident wave power, and the reflected power.

The look-up can further include a linear or non-linear approximation of lookup values between table values of dielectric constants, in order to provide a best fit look up of a soil moisture for a given dielectric constant.

In a further related embodiment, the soil calibration table 518 can be static (i.e. invariant or constant), and can be optimized for use on a particular field, or for use in a general area, whereby the multi spectrum analyzer 512 can be configured to perform a single-ended or absolute calculation of a dielectric constant.

In a further related embodiment, the soil calibration table 518 can be dynamic (i.e. updateable/variable), and can be optimized for use on a particular field, or for use in a general area, whereby the multi spectrum analyzer 512 can be configured to perform a differential calculation of soil moisture, which can include:

a) That the soil calibration table 518 can be periodically updated based on measurement against a complete calibration sample with known soil moisture, such that the entire calibration table 518 is updated with calculated dielectric constants correlated with known soil moisture values; or b) That the soil calibration table 518 can be configured to be periodically updated based on measurement against a partial calibration sample with known soil moisture values, such that:
  i. a first part of the calibration table 518 can be updated with calculated dielectric constants correlated with known soil moisture values; and
  ii. a second part of the calibration table 518 is updated such that a functional transform is applied to original soil moisture values to obtain modified for table entries in the second part of the calibration table 518, wherein the functional transform is a best fit to the mapping of original soil moisture values to updated soil moisture values from the update of the first part of the calibration table 518.
  The functional transform can for example be linear function or a non-linear function.

In a further related embodiment, the measurement vehicle 110 can for example be configured to:
a) perform a daily partial calibration, for example during an initial morning session, such that the soil calibration table 518 is updated based on measurement against a partial calibration sample with known soil moisture values; and
b) perform a daily partial calibration, for example during an initial morning session, such that the soil calibration table 518 is updated based on measurement against a complete calibration sample with known soil moisture values.

In related embodiments, wherein the multi spectrum analyzer 512 is configured to perform a differential measurement of soil moisture, the impact from errors and noise in the system for remote moisture monitoring and control 100 can be canceled out or reduced, and the quality/accuracy of measurement can be improved by an order of magnitude.

In a further related embodiment, the multi spectrum analyzer 512 can be configured to determine a soil moisture of the field at a set of predetermined penetration depths by sending a set of transmissions signals with varying frequency, in communication with the antenna manager 510, which communicates with the transceiver antenna 116, and thereby adjusting the average penetration depth of a return signal, and thereby obtaining a first set of moisture measurements for each average penetration depth.

In a yet further related embodiment, the multi spectrum analyzer 512 can further be configured to calculate the sequences of differences between successive measurements in the first set of moisture measurements, in order of increasing penetration depth, thereby determining a set of discrete measurements at varying penetration depths, which aggregate to the moisture measurement at the maximum penetration depth.

In a further related embodiment, the multi spectrum analyzer 512 can be configured to determine a soil moisture of the field at a set of predetermined penetration depths by sending a series of bursts at a burst frequency of transmission signals at a predetermined transmission frequency, in communication with the antenna manager 510, which communicates with the transceiver antenna 116, such that the multi spectrum analyzer 512 is configured to execute high-frequency sampling at a sampling frequency, which is a multiple higher than the burst frequency, such that the multi spectrum analyzer for each burst in the series of bursts obtains a series of return signal samplings, while the burst is penetrating to a predetermined penetration depth, in communication with the transceiver antenna 116, and thereby obtaining a second set of sequential moisture measurements at ratios of the penetration depth.

In a yet further related embodiment, the multi spectrum analyzer 512 can further be configured to calculate the sequences of differences between successive measurements in the second set of moisture measurements, in order of increasing penetration depth, thereby determining a set of discrete measurements at varying penetration depths, which aggregate to the moisture measurement at the maximum penetration depth.

In a related embodiment, the moisture control server 130 can further include a soil simulator 520, which is configured to perform calculations on a model of the soil in a field, whereby the soil simulator 520 can perform calculations on a 3-dimensional model of soil moisture of farmland and large agricultural areas.

In a further related embodiment, the soil simulator 520 can implement a numerical soil model, which calculates moisture propagation as a three dimensional boundary value problem, wherein boundary values are defined by the soil to air interface (surface, x and y), and soil below surface (along the z axis) over a field area. The soil simulator 520 can model key parameters, which describe the soil in the field, including:
  a) Soil particle size distribution (soil particle size in 3 dimensions);
  b) Hydraulic conductivity (water flows in the z axis direction);
  c) Soil water diffusivity (water moving in the x, and y direction).

In a yet further related embodiment, the soil simulator 520 can be configured with a numerical soil model, which uses well-known methods for solving a set of ordinary differential equations with boundary values, including the shooting method, extended shooting methods, finite difference analysis, Galerkin methods, or collocation methods, and other well-known methods or algorithms for solving boundary value problems.

In a related embodiment, the boundary values can be:
  a) a set of soil moisture measurements, each correlated with a location;
  b) a set of sensor measurement, obtained from the ground sensors 170, each sensor measurement correlated with a location.

In related embodiments, the numerical soil model will result in delivering soil moisture readings and soil water storage as a function of time thereby helping local managers of farmland or large agricultural areas to optimize watering and care of crops. Furthermore, scenarios can be fed into the model which will further add in its value to local managers as they will be able to test different scenarios, such as crop type, crop maturity, weather conditions, water conditions, etc.

In a related embodiment, the soil simulator 520 can be configured to implement a numerical soil model, which calculates moisture propagation as a three-dimensional boundary value problem, by solving a predetermined set of ordinary differential equations with predetermined boundary values, wherein the boundary values can include:
  a) a set of soil moisture measurements, each correlated with a soil location; and
  b) a set of sensor measurements, obtained from the ground sensors, each sensor measurement correlated with a sensor location.

It shall be understood that an executing instance of an embodiment of the system for remote moisture monitoring and control 100, as shown in FIG. 1, can include a plurality of mobile control devices 160, which are each tied to one or more users 190.

An executing instance of an embodiment of the system for remote moisture monitoring and control 100, as shown in FIG. 1, can similarly include a plurality of moisture control servers 130.

Figure 8:
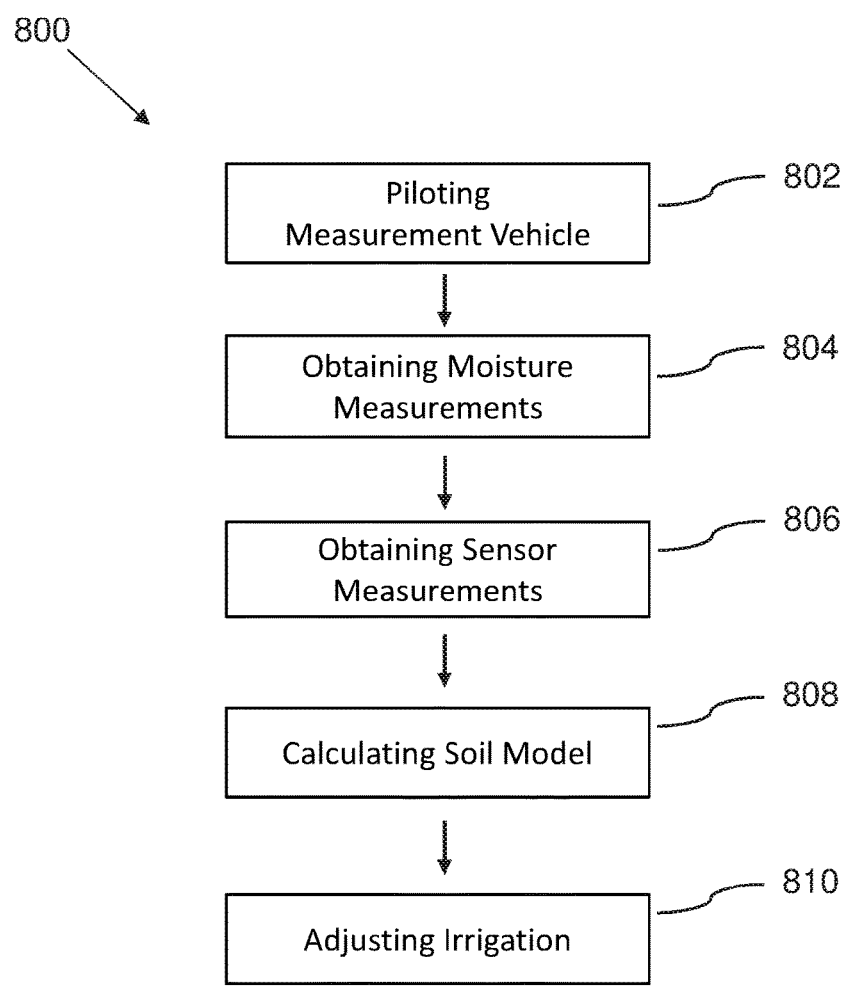
FIG. 8 is a flowchart illustrating steps that may be followed, in accordance with one embodiment of a method or process of remote moisture monitoring and control.

In an embodiment, as illustrated in FIG. 8, a method for remote moisture monitoring and control 800 can include:
  a) Piloting measurement vehicle 802, wherein a measurement vehicle 110 is piloted over a field, such that the measurement vehicle 210 for example can be a ground vehicle 210, which is driving over the field, or an aviation vehicle 310 410, which is flying over the field;
  b) Obtaining moisture measurements 804, wherein the measurement vehicle 110 obtains moisture measurements from the field, comprising:
    i. controlling transmission of an outbound electromagnetic signal with a predetermined incident wave power;
    ii. determining a reflected power of an inbound electromagnetic signal, wherein the inbound electromagnetic signal is a reflection in soil of the field of the outbound electromagnetic signal;
    iii. calculating a calculated dielectric constant via a reflection calculation, based on a predetermined dielectric constant of air, the incident wave power, and the reflected power; and
    iv. determining a soil moisture of the field by lookup of the calculated dielectric constant in a soil calibration table that correlates dielectric constant with soil moisture;
  c) Obtaining sensor measurements 806, wherein the measurement vehicle 110 obtains sensor measurements from the field, comprising:
    receiving sensor measurements from ground sensors in the field;
  d) Calculating soil model 808, comprising
    wherein a moisture control server 130 calculates moisture propagation as a three-dimensional boundary value problem on a numerical soil model of the field, by solving a predetermined set of ordinary differential equations with predetermined boundary values, wherein the predetermined set of ordinary differential equations are configured to model moisture propagation in the field, wherein the boundary values include:
  a set of soil moisture measurements, each correlated with a soil location; and
  a set of sensor measurements, obtained from the ground sensors, each sensor measurement correlated with a sensor location;
e) Adjusting irrigation 810, comprising:
  v. Controlling irrigation in the field by adjusting irrigation valves, including:
    1. increasing irrigation in the field, in locations where the numerical soil model predicts that soil moisture is less than an optimal soil moisture value; and
    2. decreasing irrigation in the field, in locations where the numerical soil model predicts that soil moisture is above the optimal soil moisture value.

FIGS. 1, 2, 3 and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for remote moisture monitoring and control 100, including the moisture control server 130, the vehicle control unit 114, and the mobile control devices 160. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the moisture control server 130, the vehicle control unit 114, and the mobile control device 160 are to be interpreted in the most general manner.

For example, the processors 502 602 702, can each respectively include a single physical microprocessor or microcontroller, a cluster of processors, a datacenter or a cluster of datacenters, a computing cloud service, and the like.

In a further example, the non-transitory memories 504 604 704 can each respectively include various forms of non-transitory storage media, including random access memory and other forms of dynamic storage, and hard disks, hard disk clusters, cloud storage services, and other forms of long-term storage. Similarly, the input/outputs 506 606 706 can each respectively include a plurality of well-known input/output devices, such as screens, keyboards, pointing devices, motion trackers, communication ports, and so forth.

Furthermore, it shall be understood that the moisture control server 130, the vehicle control unit 114, and the mobile control device 160 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the vehicle control unit 114 communicates with the moisture control server 130 over a first network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

In a related embodiment, the mobile control device 160 communicates with the moisture control server 130 over a second network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the moisture control server 130, the vehicle control unit 114, and the mobile control devices 160, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the moisture control server 130, the vehicle control unit 114, and the mobile control device 160. The components of the moisture control server 130 can be distributed over a plurality of physical, logical, or virtual servers. Parts or all of the components of the mobile control device 160 can be configured to operate in the moisture control server 130, whereby the mobile control devices 160 for example can function as a thin client, performing only graphical user interface presentation and input/output functions. Alternatively, parts or all of the components of the moisture control server 130 can be configured to operate in the mobile control device 160.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for remote moisture monitoring and control, comprising:
    a) at least one measurement vehicle, further including:
        a vehicle body, wherein the vehicle body is selected from the group consisting of a ground vehicle body and an aviation vehicle body;
        a vehicle control unit, which is attached to the vehicle body; and
        at least one transceiver antenna, which is configured to send and receive electromagnetic signals, wherein the electromagnetic signals are reflected back from a ground surface layer of soil in a field; and
    b) a moisture control server, which is connected to the measurement vehicle, via a network;
    wherein the vehicle control unit is configured to control transmission of an outbound electromagnetic signal with a predetermined incident wave power, via the transceiver antenna;
    wherein the vehicle control unit is configured to determine a reflected power of an inbound electromagnetic signal, which is received via the transceiver antenna, wherein the inbound electromagnetic signal is a reflection in the soil of the outbound electromagnetic signal;
    wherein the moisture control server is configured to determine a soil moisture of the field by lookup of a calculated dielectric constant in a soil calibration table that correlates dielectric constant with soil moisture;
    wherein the moisture control server is configured to calculate the calculated dielectric constant via a reflection calculation, based on a predetermined dielectric constant of air, the incident wave power, and the reflected power;
    wherein the transceiver antenna is constructed to transmit a set of transmission signals at varying frequency, each respective transmission signal at a different frequency, and to receive, for each respective transmitted signal, a reflected electromagnet signal that indicates soil moisture at a particular soil depth, whereby evaluating the reflected signals from the plurality of transmitted signals enables soil moisture to be profiled as a function of soil depth.

2. The system for remote moisture monitoring and control of claim 1, wherein the at least one transceiver antenna comprises:
    a) a separate transmission antenna; and
    b) a separate receiver antenna.

3. The system for remote moisture monitoring and control of claim 1, further comprising:
    a vehicle storage facility, which is configured to receive the at least one measurement vehicle.

4. The system for remote moisture monitoring and control of claim 1, further comprising:
    a) an irrigation controller, which is connected to the moisture control server; and
    b) irrigation valves, which are connected to the irrigation controller, such that the irrigation controller is configured to control the irrigation valves, which are configured to adjust irrigation of the field.

5. The system for remote moisture monitoring and control of claim 1, further comprising:
    a mobile control device, which is connected to the control server, such that the mobile control device is configured to enable a user to control functions of the control server, via interaction with the mobile control device.

6. The system for remote moisture monitoring and control of claim 1, further comprising:

at least one fixed location ground sensor, which is wirelessly connected to the vehicle control unit, such that the vehicle control unit is configured to receive sensor measurements from the at least one ground sensor.

7. The system for remote moisture monitoring and control of claim 1, wherein the moisture control server further comprises:
   a) a processor;
   b) a non-transitory memory;
   c) an input/output component;
   d) an antenna manager, which is configured to control functions of the at least one transceiver antenna in communication with the vehicle control unit;
      wherein the antenna manager is configured to generate and transmit an outbound radio frequency spectrum in communication with the at least one transceiver antenna, via the vehicle control unit;
      wherein the antenna manager is configured to receive, store, and process a return radio frequency spectrum in communication with the transceiver antenna, via the vehicle control unit; and
   e) a multi spectrum analyzer, which is configured to analyze the return radio frequency spectrum; all connected via;
   f) a data bus.

8. The system for remote moisture monitoring and control of claim 7, wherein the moisture control server further comprises:
   a sensor manager, which is configured to receive, store, and process a sensor measurement received in communication with a fixed location ground sensor, via the vehicle control unit.

9. The system for remote moisture monitoring and control of claim 7, wherein the moisture control server further comprises:
   an irrigation manager, which is configured to control irrigation valves in communication via an irrigation controller.

10. The system for remote moisture monitoring and control of claim 7, wherein the multi spectrum analyzer is further configured to:
    send the set of transmissions signals with varying frequency, in communication with the antenna manager, which communicates with the transceiver antenna; and thereby adjust the average penetration depth of a return signal, and thereby obtain a set of moisture measurements, such that each moisture measurement is correlated with a corresponding average penetration depth;
    whereby the multi spectrum analyzer is configured to determine a soil moisture of the field at a set of predetermined penetration depths.

11. The system for remote moisture monitoring and control of claim 10, wherein the multi spectrum analyzer is further configured to:
    calculate a sequence of differences between successive measurements in the set of moisture measurements, in order of increasing penetration depth, thereby determining a set of discrete measurements at varying penetration depths, which aggregate to a total moisture measurement at a maximum penetration depth.

12. The system for remote moisture monitoring and control of claim 7, wherein the multi spectrum analyzer is further configured to:
    send a series of bursts at a burst frequency of transmission signals at a predetermined transmission frequency, in communication with the antenna manager, which communicates with the transceiver antenna;
    such that the multi spectrum analyzer is configured to execute high-frequency sampling at a sampling frequency, which is a multiple higher than the burst frequency, such that the multi spectrum analyzer for each burst in the series of bursts obtains a series of return signal samplings, while the burst is penetrating to a predetermined penetration depth, in communication with the antenna manager, which communicates with the transceiver antenna; and
    thereby obtain a set of sequential moisture measurements at ratios of the penetration depth;
    whereby the multi spectrum analyzer is configured to determine a soil moisture of the field at a set of predetermined penetration depths.

13. The system for remote moisture monitoring and control of claim 12, wherein the multi spectrum analyzer is further configured to:
    calculate a sequence of differences between successive measurements in the set of moisture measurements, in order of increasing penetration depth, thereby determining a set of discrete measurements at varying penetration depths, which aggregate to a total moisture measurement at a maximum penetration depth.

14. The system for remote moisture monitoring and control of claim 7, wherein the moisture control server further comprises:
    a soil simulator, which is configured to implement a numerical soil model, which calculates moisture propagation as a three-dimensional boundary value problem, by solving a predetermined set of ordinary differential equations with predetermined boundary values, wherein the boundary values include:
    a set of soil moisture measurements, each correlated with a soil location; and
    a set of sensor measurements, obtained from fixed location ground sensors, each fixed location sensor measurement correlated with a fixed location ground sensor location.

15. The system for remote moisture monitoring and control of claim 7, wherein the moisture control server further comprises the soil calibration table, and wherein the multi spectrum analyzer is configured to periodically update the soil calibration table based on measurements against a calibration sample with known soil moisture values.

16. The system for remote moisture monitoring and control of claim 1, wherein the vehicle control unit further comprises:
    a) a processor;
    b) a non-transitory memory;
    c) an input/output;
    d) an antenna controller, which is configured to communicate with and control functions of the transceiver antenna, including communicating the outbound radio frequency spectrum to the transceiver antenna for transmission by the transceiver antenna and receiving the return radio frequency spectrum in communication with the transceiver antenna; and
    e) a sensor controller which is configured to receive sensor data in communication with at least one fixed location ground sensor; all connected via
    f) a data bus.

17. The system for remote moisture monitoring and control of claim 16, wherein the vehicle control unit further comprises:
    a location controller, which is configured to determine a location of the measurement vehicle.

18. A method for remote moisture monitoring and control, comprising:
   a) piloting a measurement vehicle, wherein the measurement vehicle is piloted over a field; and
   b) obtaining moisture measurements at a plurality of soil depths, wherein the measurement vehicle obtains moisture measurements from the field, comprising:
      controlling transmission of a plurality of outbound electromagnetic signals, each signal targeted to a different soil depth, and each outbound electromagnetic signal with a predetermined incident wave power;
      determining a reflected power of an inbound electromagnetic signal for each of the respective outbound electromagnetic signals, wherein each inbound electromagnetic signal is a reflection in soil of the field of the outbound electromagnetic signal;
      calculating, for each respective inbound electromagnet signal, a calculated dielectric constant via a reflection calculation, based on a predetermined dielectric constant of air, the incident wave power, and the reflected power;
      determining, for each respective inbound electromagnet signal, a soil moisture of the field by lookup of the calculated dielectric constant in a soil calibration table that correlates dielectric constant with soil moisture; and
      evaluating the inbound electromagnet signals to determine soil moisture as a function of soil depth.

19. The method for remote moisture monitoring and control of claim 18, further comprising:
   obtaining sensor measurements, wherein the measurement vehicle wirelessly receives sensor measurements from fixed location ground sensors in the field.

20. The method for remote moisture monitoring and control of claim 19, further comprising:
   calculating a numerical soil model, wherein a moisture control server calculates moisture propagation as a three-dimensional boundary value problem on a numerical soil model of the field, by solving a predetermined set of ordinary differential equations with predetermined boundary values, wherein the predetermined set of ordinary differential equations are configured to model moisture propagation in the field, wherein the boundary values comprise:
   a set of soil moisture measurements, each correlated with a soil location; and
   a set of sensor measurements, obtained from the fixed location ground sensors, each fixed location ground sensor measurement correlated with a sensor location.

21. The method for remote moisture monitoring and control of claim 20, further comprising:
   adjusting irrigation, comprising adjusting irrigation valves to control irrigation in the field, comprising:
   increasing irrigation in the field, in locations where the numerical soil model predicts that soil moisture is less than an optimal soil moisture value; and
   decreasing irrigation in the field, in locations where the numerical soil model predicts that soil moisture is above the optimal soil moisture value.

22. The method for remote moisture monitoring and control of claim 18, wherein piloting the measurement vehicle further comprises:
   periodically updating the soil calibration table based on measurements against a calibration sample with known soil moisture values.

* * * * *